United States Patent
Holland

(10) Patent No.: US 9,174,795 B1
(45) Date of Patent: Nov. 3, 2015

(54) TEA BAG PUMPER INFUSION APPARATUS WITH MULTI-PURPOSE HEADER ATTACHMENTS AND WATERPROOF APPARATUS HANDLING AND DISPOSAL CONTAINER

(71) Applicant: Mark Russell Holland, Oakville, CA (US)

(72) Inventor: Mark Russell Holland, Oakville, CA (US)

( * ) Notice: Subject to any disclaimer, the term of this patent is extended or adjusted under 35 U.S.C. 154(b) by 0 days.

(21) Appl. No.: 14/255,162

(22) Filed: Apr. 17, 2014

(51) Int. Cl.
- *A47J 31/40* (2006.01)
- *B65D 85/812* (2006.01)
- *A23G 3/56* (2006.01)
- *B65D 33/06* (2006.01)
- *B65D 5/48* (2006.01)

(52) U.S. Cl.
CPC .............. *B65D 85/812* (2013.01); *A23G 3/563* (2013.01); *B65D 5/48* (2013.01); *B65D 33/06* (2013.01)

(58) Field of Classification Search
CPC ............. B65D 5/46; B65D 5/48; B65D 33/06
USPC .......... 99/287, 295, 323; 426/431, 79, 78, 82; 206/0.5
See application file for complete search history.

(56) References Cited

U.S. PATENT DOCUMENTS

| | | | | |
|---|---|---|---|---|
| 2,285,113 A * | 6/1942 | Eaton | | 100/123 |
| 2,291,278 A * | 7/1942 | Cleaves | | 426/82 |
| 3,257,212 A * | 6/1966 | Kasket | | 426/82 |
| 3,387,978 A * | 6/1968 | Major | | 426/80 |
| 4,211,156 A * | 7/1980 | Zimmermann | | 99/287 |
| 4,465,697 A * | 8/1984 | Brice et al. | | 426/79 |
| 4,651,870 A * | 3/1987 | Giambalvo | | 206/0.5 |
| 4,844,914 A * | 7/1989 | Bonne et al. | | 426/79 |
| 5,440,976 A * | 8/1995 | Giuliano et al. | | 99/485 |
| 5,441,752 A * | 8/1995 | Sandin | | 426/82 |
| 6,672,817 B2 * | 1/2004 | Denny | | 426/112 |
| 6,966,252 B2 * | 11/2005 | Hamiel et al. | | 99/323 |
| 2005/0247207 A1 * | 11/2005 | Saint | | 99/323 |
| 2006/0073238 A1 * | 4/2006 | Casey et al. | | 426/77 |

(Continued)

FOREIGN PATENT DOCUMENTS

GB 22650 * 0/1910
WO WO 2012/142968 * 10/2012

*Primary Examiner* — Nina Bhat

(57) ABSTRACT

The present invention delivers a portable and disposable infused beverage experience that is an improvement over prior art. The invention enables users to be able to realize faster and stronger permeable contents infusion, realize multiple servings of strong flavored beverages from one disposable serving, improve the cleanliness and efficiency of saturated beverage bag handling and disposal and provides a means to deliver other experience enhancing products and/or information. The invention components work together to provide an attractive, streamlined design that enables beverage creators to cleanly and efficiently increase liquid flow velocity and duration through a tea bag which improves the speed and intensity of infusion. Cleaner saturated tea bag handling and disposal benefits are delivered with specialized invention handling functionality and in combination with the apparatus packaging that provides a waterproof handling container. The invention provides the ability to add specialized header attachments to the top of the apparatus that deliver multiple types of additional products and/or information to beverage consumers. The header attachment provides the ability for new "game changing" methods to be executed that will enable current infused beverage Customers to be acquired and retained and new Customers to be developed and retained.

3 Claims, 13 Drawing Sheets

(56) References Cited

U.S. PATENT DOCUMENTS

| | | | |
|---|---|---|---|
| 2007/0209523 A1* | 9/2007 | Miceli | 99/279 |
| 2008/0028945 A1* | 2/2008 | Almond | 99/287 |
| 2009/0081333 A1* | 3/2009 | Chizinsky | 426/79 |
| 2012/0107455 A1* | 5/2012 | Briggs | 426/78 |
| 2014/0178532 A1* | 6/2014 | Walker et al. | 426/78 |

* cited by examiner 5
10
15
20

FIG. 1I
FIG. 1J
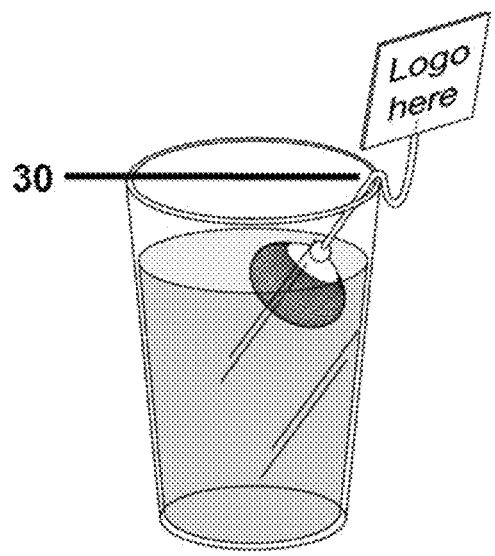
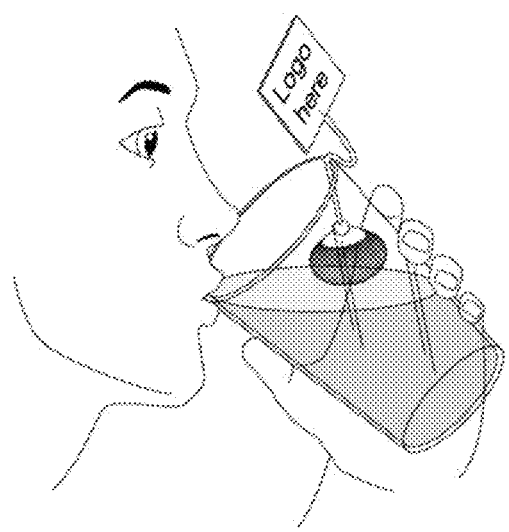

35

40
45

50

55

60

FIG. 5A
FIG. 5B
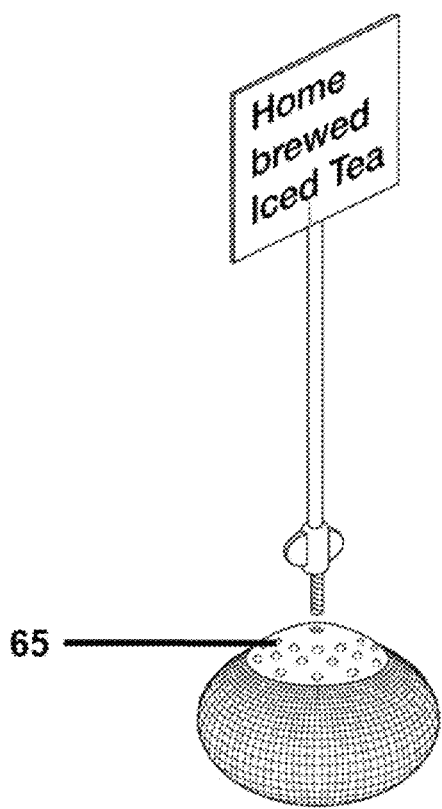
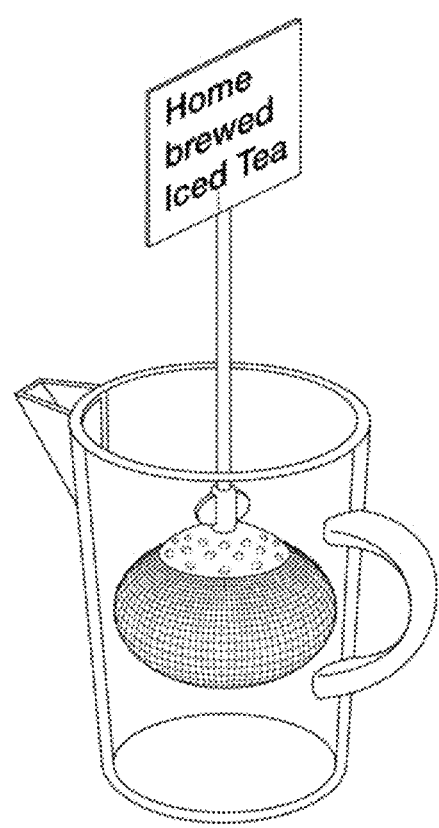

TEA BAG PUMPER INFUSION APPARATUS WITH MULTI-PURPOSE HEADER ATTACHMENTS AND WATERPROOF APPARATUS HANDLING AND DISPOSAL CONTAINER

CROSS-REFERENCE TO RELATED APPLICATIONS

Not Applicable

SPECIFICATION KEY DEFINITIONS

"Tea Bag":

For efficiency in this patent filing, the term "tea bag" will be used to describe all material and substances contained in a tea bag type container that is intended to transfer permeable contents into liquid to create a beverage. Tea, coffee, herbals, cocoa, hot chocolate, soup bases, flavored drinks, energy drinks, health supplement ingredients are examples. The material contained can include medicine ingredients and flavor enhancing ingredients that will infuse into liquid.

"Individual Serving":

The term "Individual Serving" when used in describing this invention is not intended to communicate one standard cup (8 ounces) of beverage. These terms are intended to communicate that one individual use experience of the invention which can use one individual serving unit of the apparatus in order to create more than one cup of desired strength beverage. For example, Jane enjoyed a work break where she used an "individual serving" package of the disposable beverage infuser apparatus to create and enjoy multiple 8 ounce cups of infused beverage.

"TEA-UP":

For efficiency in this patent filing, the term "TEA-UP" will be used in the Detailed Description of the Invention Section to reference the invention apparatus removed from the packaging as illustrated in FIG. 1A.

BACKGROUND OF THE INVENTION

The present invention relates generally to the field of preparing infused beverages using a disposable infusion apparatus. Tea preparation using a disposable tea bag would be the dominant beverage type and method related to this field of this invention. The improvements over prior art delivered by this invention extends to all beverage types prepared using dry materials that infuse contents into liquid.

Tea is the number one brewed beverage consumed by volume in the world and the number two beverage consumed after water. According to Wikipedia 2014, "Tea is the most popular manufactured drink in the world in terms of consumption. Its total consumption equals all other manufactured drinks in the world, including; coffee, chocolate, soft drinks, and alcohol, combined."

According to the 2013 US Tea Fact Sheet, tea can be found in almost 80% of all U.S. homes. It is the only beverage commonly served hot or iced, anytime, anywhere, for any occasion. On any given day, over 158 million Americans are drinking tea. In 2012, Americans consumed well over 79 billion servings of tea, with approximately 85% of this consumption being iced. Hot brewed tea consumption is 11.85 Billion units per year or 32.5 Million units per day.

In 2012, over 65% of the total tea brewed in the United States was prepared using tea bags. Away from home consumption of tea has increased by at least 10% over the last decade and the industry anticipates strong, continuous growth over the next five years. This growth will come from all segments driven by convenience, benefits of healthy properties of tea, the continued development of unique blends and flavors and the ability to deliver health improving supplements. Global first world country tea consumption markets are massive and continue to expand. Currently, tea of all types, flavor and supplement infusions can be accessed through online companies and through a growing retail market of tea stores and other retail outlets.

The first tea bags were hand-sewn silk bags. Tea bag patents date as early as 1903 (U.S. Pat. No. 723,287), and tea bags were successfully marketed by the tea and coffee shop merchant Thomas Sullivan from New York, who shipped his tea bags around the world. The loose tea was intended to be removed from the sample bags by the customers, but they found it efficient to brew the tea with the tea still enclosed in the bags. Over the last century the tea bag, has seen some improvements in structure and membrane materials used. Modern tea bags are typically made of paper fiber. The heat-sealed paper fiber tea bag was invented by William Hermanson, who subsequently sold his patent to the Salada Tea Company in 1930.

In 1944, the typical shape of the tea bag was upgraded from the sack style of bag to the rectangular style of tea bag. In 1952, Lipton Tea Company patented a "flow-thru" bag, which has four sides (U.S. Pat. No. 5,366,741). In 1992, Tetley launched the round tea bag and actively marketed the benefits of faster and stronger infusion. The pyramid tea bag shape was invented by Brooke Bond and continues to be a popular in India and is marketed through the brand, Taj Mahal Tea. This invention increased the area for tea to move freely in the tea bag versus a flat tea bag. This change results in greater total tea leaf surface area being made available to water which can result in improved infusion.

The goal of the majority of these evolving tea bag inventions is to enable more water to flow over a greater surface area of tea leaves and produce a stronger infusion, faster. The tea bag advantage is that it is highly portable, disposable and can be used to deliver varying beverage strengths.

A disadvantage with the string attachment used to facilitate infusion with a tea bag is that it delivers a short distance of tea bag movement and a weak velocity of movement in liquid causing more effort and time to be exerted to generate an infused beverage. The string is also often not used to move the tea bag to facilitate infusion and is just used to remove the tea bag from the beverage container, once steeping is complete. The weakness of infusion ability of the string and tea bag apparatus also makes it increasingly harder to utilize one tea bag to generate multiple servings of strong infusions. Opportunity exists to improve on this prior art by providing means to increase the distance and velocity of tea bag movement in a beverage container in order to deliver improved infusion results.

Another disadvantage associated with tea bags is the sloppiness and inefficiency in handling a liquid infused tea bag after beverage preparation and disposal. Opportunities exist to improve on this prior art by providing means to increase the cleanliness and efficiency of tea bag handling during use and disposal.

In recent years, loose leaf tea consumption has significantly increased at home, at work and in retail outlets. There are many methods and devices that have been invented in order to enable the use of loose leaf tea to facilitate infusion and generate beverages.

"Tea socks" are used to create infused beverages using loose-leaf tea. These tea-bag-like infusers that are constructed with similar materials and, like tea bags, are disposable. They are filled with the infusible materials of your choice and then folded, clipped or tied shut for during infusing. Upon completion of infusion these socks are removed and thrown away. Another patented example is a cup sized disposable cone (U.S. Pat. No. 5,424,083) that is filled with infusible materials then liquid is poured into the cup and it filters through the disposable cone filter. The filter is then removed from the cup and the infused beverage remains. The disadvantages with these prior art methods are the same as tea bags and also include the fact that loose leaf tea or other beverage infusion materials need to be separately acquired and placed in these disposable infusion containers.

Other non-disposable, re-usable individual brewing devices mount directly on a beverage container and are used to facilitate loose leaf tea infusions. A device (U.S. Pat. No. 4,619,830) uses a filter suspended on a rod, where the filter can hang within a cup, and is removed when steeping is complete. Another patented device, the "Tea Ball" (U.S. Pat. 2007/0101870) employs an apparatus that includes a tea basket that is filled with loose leaf tea and supported for infusion be a circular device that fits around the rim of a beverage container. Another patented device, is a metal basket that is filled with loose leaf tea and hangs on the side of a cup and submerges the loose leaf tea into the liquid in the cup in order to facilitate infusion (US 2014/0053737). The disadvantages with these types of devices are that they can be unstable, are not very portable, are apparatus intensive, only fit specific size beverage containers, require loose leaf tea supplies to be available and require excessive apparatus handling and cleaning requirements.

"French press" or "Bodum" type devices which are primarily used for coffee can also be used to brew loose leaf tea and other infusible beverages. Basically, the infusible material is placed in a beverage container containing hot water and the steeping process occurs. When steeping is complete a plunger device that is fitted for the beverage container and is largely comprised of a fine mesh is depressed and the infusible material is captured at the bottom of the device and a consumable infused beverage results. The coffee press was first patented (U.S. Pat. No. 1,797,672) by Italian Designer Attilio Calimani in 1929. It underwent several design modifications through Faliero Bondanini, who patented his "Chambord" version in 1958 (U.S. Pat. No. 2,900,896). This type of device was further popularized globally by the Danish tableware and kitchenware company, Bodum (U.S. Pat. D557,978).

Disadvantages with this method are the cleaning requirements for each infusion occurrence and the requirement to have the device available limits portability. Also tea will continue to steep even after the plunger is depressed which may cause the tea remaining in the press to become an undesirable flavor. This can be prevented by pouring the tea into another container, which is another handling and cleaning disadvantage.

Disposable beverage press (U.S. Pat. No. 20,130,125,761) type devices have been patented. These devices are basically beverage presses designed with disposable materials and fitted for a disposable cup. The disadvantages are the same for these types of inventions as the non-disposable press designs, except for the cleaning requirements. These devices are also apparatus and process intensive which counters the goals of ease of beverage preparation that should accompany portability and disposability.

Another group of methods and devices currently used to deliver infused beverages are cartridge based beverage delivery systems. The Keurig Company is a well-known brand of patented beverage infusion machines that use disposable single serving beverage cartridges (U.S. Pat. No. 7,165,488). These machines use specific shaped disposable cartridges that are full of infusible materials. The dominant usage volumes are coffee cartridges, but they also supply cartridges with beverage infusions for tea, cider, hot cocoa, and other specialty infusions. The machines are filled with cup sized portions of water and the water is passed through the inserted cartridges. The result is a fixed portion size of a fixed strength beverage. The used cartridge can then be removed from the machine and the cartridge disposed.

The advantages of this machine and cartridge system are that beverages can be efficiently prepared with a clean preparation and disposal process. This method is of significant value to hotel businesses where customers can efficiently enjoy hot beverages in their room. These machines are also used in homes and businesses that supply beverage options for employees.

A significant disadvantage with these machine-cartridge based systems is that the physical size of these brewing machines eliminates the ability to enjoy portability. These cartridges also deliver only one flavor strength of brewed beverages. Users have no opportunity to under or over infuse the flavor transfer to their desired strength with these machine-cartridge based systems. Another disadvantage with the cartridge and machine system is that a single serving is the result of the use of one cartridge, there is no ability to generate another quality strength beverage serving out of a single serving cartridge. With cartridge and machine designs being patent protected the cost per serving can be significantly higher than other methods.

Opportunities exist to improve over this prior art by delivering high quality infusion beverage types and flavors with a portable, disposable apparatus that does not require any cleaning, can deliver the flexibility for Users to prepare their desired infusion strengths and can deliver multiple servings of desired strength beverages. As previously disclosed in this section, the infusible beverage global market is massive and expanding. Premium tea types, flavors and health improving supplements can be ordered on-line from a large variety of global and regional companies. Opportunities have been identified that improve on prior art by providing products that improved customers experiences and deliver additional value as part of a portable and disposable premium infused beverage.

We identified that opportunities exist to improve on prior art by adding additional products to a beverage infusion apparatus that are efficiently attached and attractively displayed. These added products can be personalized in order to deliver an added "positive emotional" boost and/or "show off ability" boost to a User. These added headers enable "game changing" sales methods to be executed that will attract and retain current infused beverage Customers and enable the creation and retention of new Customers.

Opportunities exist to deliver value to businesses by leveraging a daily consumable beverage infusion apparatus that can also communicate information to Consumers. Opportunities exist to leverage current internet e-commerce abilities to enable high-quality personalized and customized gifts that deliver premium infused beverages of a variety of types and flavors that also deliver personalized images that are of great value to gift receivers. Opportunities exist to efficiently deliver other value and experience enhancing products with a beverage infusion apparatus that are not delivered by prior art. For example, the ability to enjoy a cold and flu medicine infused tea created with the infusion apparatus and then enjoying a throat lozenge lollipop that is detached from the infusion apparatus tea-bag attachment after the beverage is enjoyed.

SUMMARY OF THE INVENTION

The present invention discloses a portable, disposable beverage infusion apparatus that also delivers other products and is intended to improve on prior art.

It is an object of the invention to provide an apparatus for creating individual cups of infused beverages. The apparatus is designed to hold infusible materials in a tea bag type holder at the bottom of the apparatus. The tea bag is attached to a pumper attachment that is attached to a shaft that extends upward from the tea bag and pumper attachment. The apparatus is topped off with a header attachment. The invention delivers improved infusion ability due to the fact that the apparatus enables the tea bag to be pumped up and down in the liquid using the header attachment. The pumping action enabled by the invention creates greater liquid flow velocity over a greater duration in the beverage container liquid which results in stronger infusion occurring faster. The apparatus includes a buoyancy ability that enables the apparatus to support the tea bag below the surface of the water and the shaft and header attachment above the liquid, like a "flag pole" in your beverage cup. When downward force is applied to the header, superior infusion will occur, and the apparatus will then return to a stable buoyant starting point position by itself. Superior infusion results can be easily attained by pressing down on the apparatus or by pressing down and pulling up on the apparatus.

It is another object of the invention to provide an apparatus for easily creating infused beverages of a targeted strength that is defined by Individual Users. The ability to execute the infusion pumping method with this invention enables Users to attain their targeted strength of beverage flavor by facilitating infusion until the User defined target beverage flavor strength is attained and then enjoyed. These results are attained with the benefits of portability and disposability as the infusible materials are advance loaded into the apparatus tea bag type as part of the original apparatus configuration.

Another object of the invention is to enable Users to enjoy more than one serving of desired strength beverages from one apparatus. The infusion ability of the apparatus that enables increased force of fluid flow through our tea bag membrane also enables Users to re-use the apparatus to prepare more than one serving of desired strength beverages. The tea bag membrane structure and infusible material contents structure in combination with the greater force of water flow over a greater duration enables increased leeching of permeable contents into liquid, faster. The apparatus can also be used in larger capacity beverage containers in order to deliver larger volume of desired strength servings, faster.

Another object of the invention is to enable clean and efficient processes for beverage preparation, infusion apparatus handling and infusing apparatus disposal. Analysis of prior art methods identified opportunities to improve the cleanliness and efficiency of handling of tea bags. Saturated tea bag handling and disposal was identified as a process improvement area of significant value for infused beverage Consumers. This invention includes a header attachment at the top of shaft that extends from a tea bag attachment. The tea bag is secured below the tea bag attachment. This apparatus results in the tea bag header and shaft attachment providing the ability for an invention User to be able to easily maneuver the tea bag using the header attachment. The header attachment is separated from the tea bag by the length of the shaft attachment.

The invention includes packaging that is an improvement over prior art. The pre-use form of the packaging provides a compact "cartridge" style packaging that is portable. After the infusion apparatus is removed the packing converts to a "blossomed flower" form that reveals a waterproof container in the center of the opened packing. The infusion apparatus, by use of the header, can be lifted above the beverage container when infusion is complete, the waterproof container packaging can be lifted underneath the liquid saturated tea bag and the apparatus can be easily and cleanly placed in the waterproof container compartment. The infusion apparatus can be held in the container and then cleanly and efficiently re-used for subsequent beverage preparations or cleanly and efficiently disposed of. The entire process of handling and disposal is enabled by the invention. If a non-disposable beverage container is used, non-disposable cup cleaning is the only cleaning requirement required for enjoying a beverage created with this invention.

The apparatus has alternate embodiments that deliver other apparatus handling cleanliness and efficiency options by providing shaft materials that are flexible and added beverage container rim attachments. Both apparatus embodiments enable the apparatus to be efficiently secured on the rim of a beverage container. If the apparatus is left alone in the beverage container the header attachment provides an easily handling method for the apparatus and the saturated tea bag, at all times.

It is another object of this invention, delivered by an alternate embodiment, to provide an apparatus that enables efficient creation of larger capacity sized infusions using a larger size tea bag. In this one alternate embodiment form a larger sized tea bag is secured to a non-buoyant tea bag attachment. The tea bag attachment is secured to a longer pumper shaft attachment that is detachable from the tea bag attachment. The apparatus enables increased infusion efficiency by enabling the up and down pumping of the shaft attachment to move a larger diameter tea bag through liquid at greater velocity for a greater distance. The tea bags and tea bag pumper attachments are disposable and the shaft attachment with attached header can be re-usable. Pitcher sized volumes of tea, iced or hot, is an example of beverage infusions produced by this embodiment.

It is another object of this invention to deliver other products and/or information utilizing the header attachment at the top of the apparatus. This is not a "novelty" attribute. This is a significant improvement and attribute of differentiation over prior art that provides the ability to deliver additional value to beverage consumers, groups and businesses. The invention apparatus that is designed to deliver infused disposable beverages by employing an innovative pumper infusion apparatus structure also serves the additional function of providing a "flagpole" that can deliver other products and/or information, not necessarily related to the infused beverage. These headers that are attached to the top of the invention header shaft can be many different product types such as character pictures, licensed sports team logos and pictures, personalized pictures and messages, edible "lollipop" candy, edible health improvement supplements, charity logos, holiday and special day headers, promotional information.

The value improvement over prior art is easy to understand through simple examples, such as; a Grandmother receiving a gift box of premium flavored health improving tea that includes 20 different unique pictures of her grandchildren with unique messages attached or a Alabama University Alumni enjoying a tea break at their New York City located company with his Alabama Crimson Tide Character Header proudly displayed as he enjoys his premium tea break delivered by this invention.

To the accomplishment of the information provided in this section and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

The foregoing and other objects, features and advantages will be apparent to those skilled in the art upon review of the detailed description herein, with reference to the drawings, in which:

FIG. 1I—Illustrates a side view of the present invention secured on the rim of a cup after beverage is prepared to desired strength. The invention "flexi-shaft" embodiment enables the shaft to bend and attach the total invention apparatus to the rim of a cup.

FIG. 1J—Illustrates a side view of the present invention secured on the rim of a cup while the beverage is consumed.

FIG. 5A—Illustrates a perspective view of an alternate embodiment of the present invention without the buoyancy ability and a detachable header and shaft apparatus. Tea bag attachment is perforated and buoyancy devices are not included.

FIG. 5B—Illustrates a perspective view of an alternate embodiment of the present invention with a detachable header and shaft that is attached to a large diameter tea bag attachment. The invention is shown in a pitcher type container.

Figure 1A:
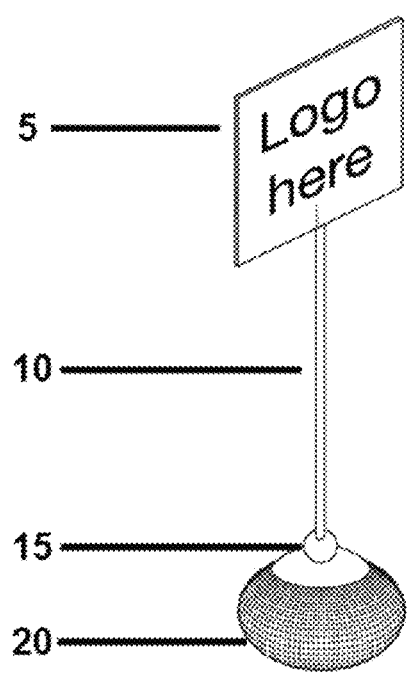
FIG. 1A—Illustrates a perspective view of the present invention, not including invention packaging.

While the invention is amenable to various modifications and alternative forms, specifics thereof have been shown by way of examples in the drawings and will be described in detail. It should be understood, however, that the intention is not to limit the invention to the particular embodiments described. The intention is to cover all modifications, equivalents, and alternatives.

DETAILED DESCRIPTION OF INVENTION

The present invention is an apparatus, including packaging, used to deliver improved infused beverage experiences and other products as apparatus attachments.

Figure 1B:
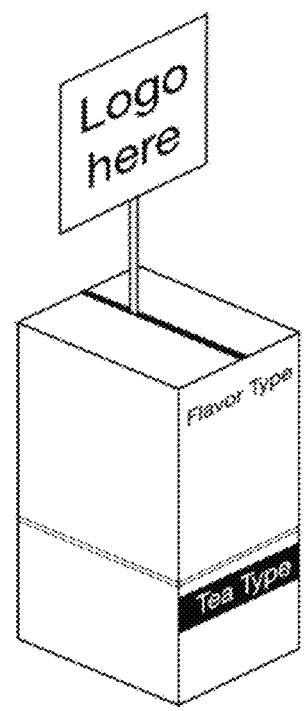
FIG. 1B—Illustrates a perspective view of the invention contained in packaging for an individual serving of a beverage.

The invention will be provided in various multi-serving packages that can be purchased from retail outlets or on-line. The multi-serving packages will contain individual serving packages (FIG. 1B). Individual serving packages will also be sold at retail outlets.

Figure 2A:
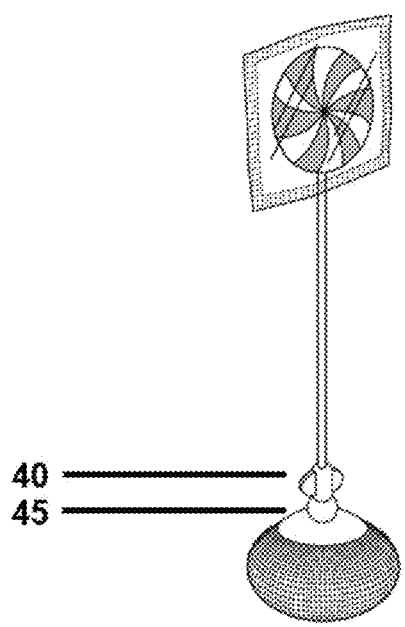
FIG. 2A—Illustrates a perspective view of the present invention with a detachable header and shaft. This is an alternate invention configuration versus a shaft that is fixed and not detachable from the tea bag attachment.
Figure 2B:
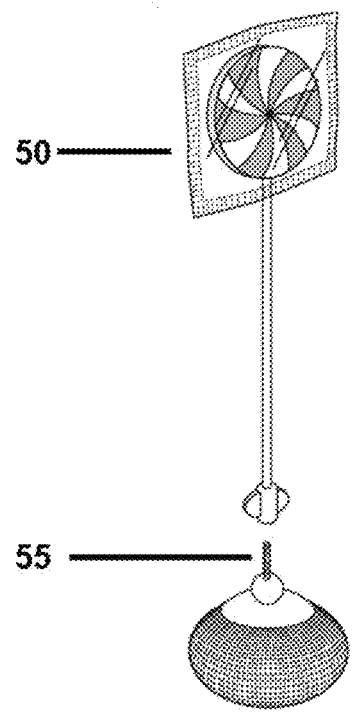
FIG. 2B—Illustrates a perspective view of the present invention with a detached header and shaft attachment. A threaded insertion that inserts and screws into the shaft is shown.

The TEA-UP is unwrapped from the invention packaging. The TEA-UP apparatus illustrated in FIG. 1A is comprised of a Multi-purpose Header 5, a Header Shaft 10, a Tea Bag Pumper Attachment 15, and a Tea Bag 20. The Header Shaft may be made of flexible (FIG. 1I) or rigid materials. The header shaft may be fixed or detachable (FIGS. 2A & 2B) from the Tea Bag Pumper Attachment 15. A filled tea bag 20 is permanently fixed to the Tea Bag Pumper Attachment 15. The tea bag can be filled with all types of infusible materials used to create consumable beverages during the manufacturing phase. The entire TEA-UP apparatus and packaging is disposable.

Figure 1C:
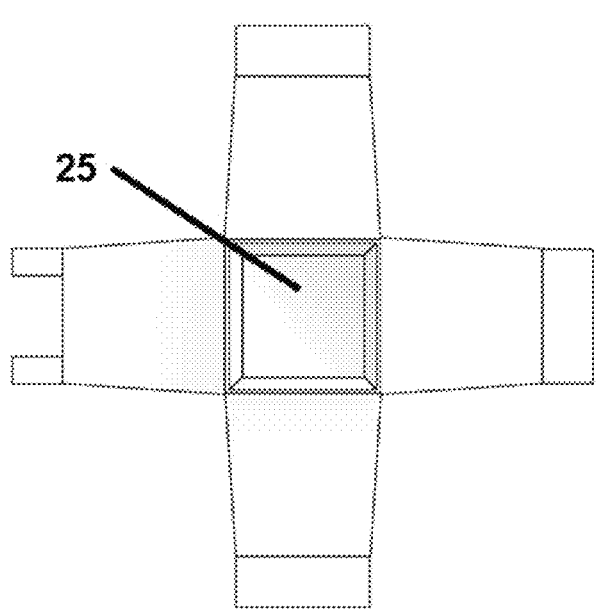
FIG. 1C— Illustrates an overhead view of an individual serving invention packaging unwrapped and revealing a waterproof container that can be used to hold a liquid saturated tea bag during invention use and disposal.

The invention packaging, when opened to remove the TEA-UP (FIG. 1C), reveals a waterproof container 25 that can be used for clean and efficient handling of the TEA-UP through all beverage experience processes. These processes include beverage preparation, consumption and disposal.

Figure 1D:
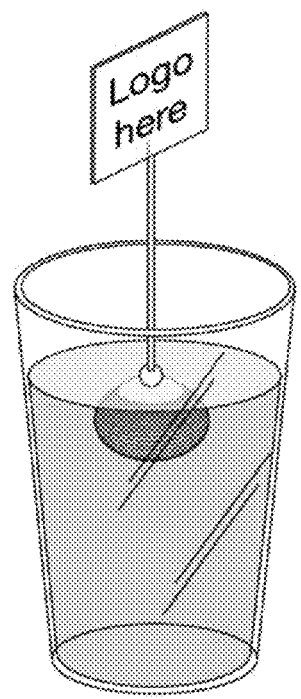
FIG. 1D—Illustrates a perspective view of the present invention placed in a cup of liquid. The apparatus is stable and buoyant in the liquid with the shaft and header being supported above the water and the tea bag below the surface of the water.

The TEA-UP when removed from the packaging is placed in a cup of liquid (FIG. 1D). The TEA-UP is buoyant and stable in this cup of liquid. The shaft and header is supported above the water and the tea bag is submerged below the surface of the water.

Figure 1E:
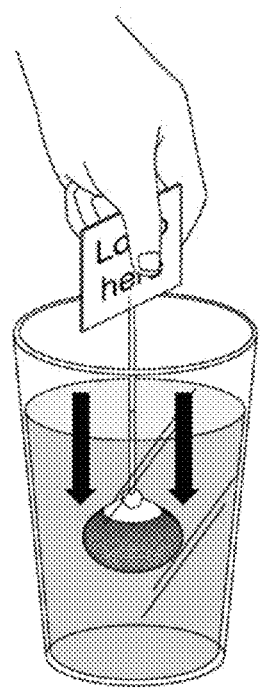
FIG. 1E—Illustrates a perspective view of the present invention being submerged in a cup of liquid by a user while preparing a beverage. The user is applying downward force on the header attachment of the invention apparatus pushing the tea bag down into the liquid.

A TEA-UP User can then press down on the header and the tea bag is forced down through the water (FIG. 1E). The buoyed resistance of the tea bag pumper attachment in combination with the downward force applied by the User for the length duration of the shaft attachment produces greater flow velocity of water through the tea bag producing improved infusion rates than standard steeping and a tea bag being moved up and down with a string attachment.

After the initial downward force is applied to the TEA-UP header and the tea bag has moved down into the beverage container the User can then use pull the TEA-UP Header back up to the original position. This upward force will result in a faster flow of water through the tea bag and a greater infusion rate. The greater distance of tea bag movement through the liquid in a beverage container is also a result of the header attachment, the shaft and pumper attachment. The shaft length enables the tea bag to be moved a greater distance through liquid than a string and tea bag method which results in improved infusion, which is an improvement over prior art.

The user can also release the header after the initial downward force is applied and the TEA-UP will return to the original surface position (FIG. 1B) by itself. This action is due to the buoyant pumper attachment 15. A User can repeat the pump action until the desired beverage strength is attained for their beverage.

The TEA-UP tea bag's 20 specialized structure and membrane properties in combination with the structure of the infusible material contents in combination with the invention pump ability contribute to the improved transfer of permeable contents.

Once the User's initial beverage is prepared they may want to remove the TEA-UP from their beverage container in order to consume their beverage. Many prior art methods presented opportunities to improve on the cleanliness and efficiency of handling an infusion apparatus and liquid saturated tea bags. This invention improves on prior art by provided packaging that enables methods for clean and efficient handling of the TEA-UP, including the saturated tea bag. The Header Attachment 5 and Header Shaft 10 provide an efficient handling apparatus for the saturated tea bag that is an improvement over prior art.

Figure 1F:
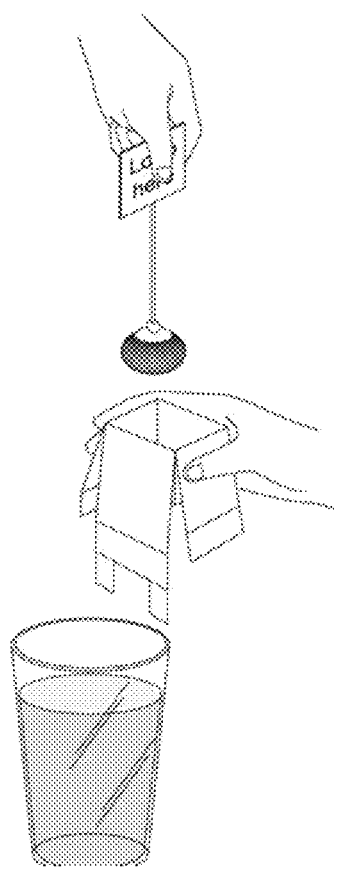
FIG. 1F—Illustrates a perspective view of the present invention removed from a beverage container and being replaced into the original packaging. The packaging contains a water proof container compartment that can hold a liquid saturated beverage bag.

The TEA-UP can be lifted using the Header Attachment 5 above the beverage container and the packaging container can be moved underneath the TEA-UP (FIG. 1F) and the saturated tea bag, as a continued part of the TEA UP, can be easily placed in the waterproof container compartment provided by the packaging.

Figure 1G:
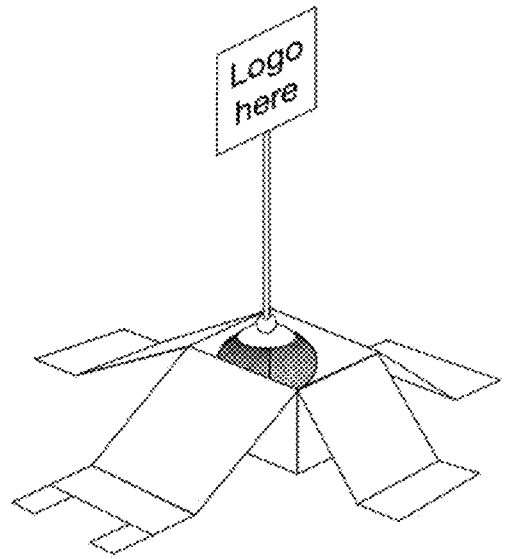
FIG. 1G—Illustrates a perspective view of the invention placed in the individual serving invention packaging after being used to create a beverage.
Figure 1H:
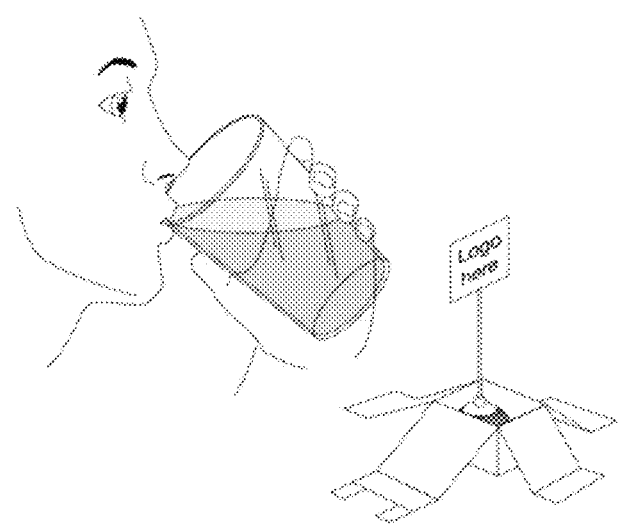
FIG. 1H—Illustrates a perspective view of the present invention entirely removed from the beverage and placed in the original packaging container. Invention User is consuming the infused beverage.

The packaging can be cleanly and efficiently moved to a standby position (FIG. 1G) in between beverage preparations and while beverages are consumed (FIG. 1H). Once complete use of the TEA-UP it can be cleanly and efficiently disposed of by utilizing the packaging. This clean and efficient handling and disposal ability is an improvement over prior art.

Figure 1K:
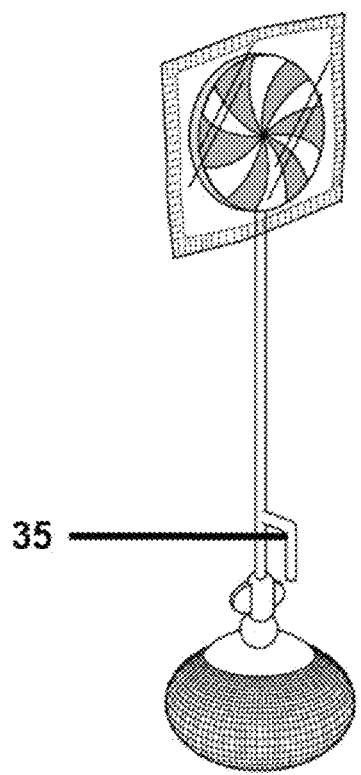
FIG. 1K—Illustrates a perspective view of the present invention with a detachable header and shaft and a "L-Shaped" beverage container rim attachment.
Figure 1L:
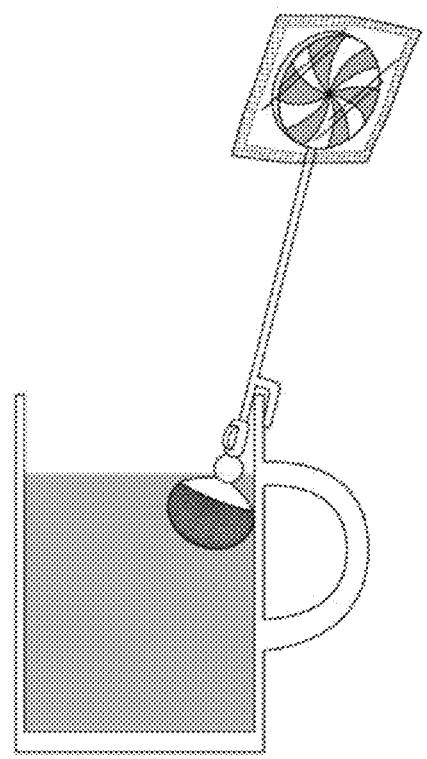
FIG. 1L—Illustrates a side view of the present invention with a detachable, straight non-flexible shaft that is secured on the rim of a cup after beverage is prepared. An "L-Shape" shaft attachment is shown securing the entire invention apparatus to the rim of the beverage container.

Other handling improvement embodiments of the invention include a shaft that is made of flexible material that enables the TEA-UP to be secured on the beverage container rim (FIG. 1I) and not impede beverage consumption (FIG. 1J). Another alternate embodiment of the invention provides a rigid shaft (FIG. 1K) and an L-shaped attachment 35 that enables the TEA-UP to be secured to the rim of a beverage container (FIG. 1L).

One alternate embodiment of this invention includes a pumper attachment that does not provide the apparatus buoyancy ability. This alternate embodiment provides an apparatus that enables efficient creation of larger capacity sized infusions using a larger size tea bag. In this form a larger sized tea bag is secured to a non-buoyant tea bag attachment. The tea bag attachment is secured to a longer pumper shaft attachment that is detachable from the tea bag attachment (FIG. 5A). This apparatus enables the user to increased infusion efficiency by enabling the up and down pumping of the shaft attachment to move the larger diameter tea bag through liquid at greater velocity for a greater distance. The tea bag that is fixed to the tea bag pumper attachment is disposable and the shaft attachment with attached header can be re-used. For example, a 10 pack of large diameter iced tea bags may include one header shaft attachment that can be used with the 10 large diameter tea bags. Pitcher sized volumes of tea, iced or hot, is an example of beverage infusions produced by this embodiment (FIG. 5B).

The TEA-UP Header 5 is a powerful innovation that delivers new value of many different types to Invention Users and Businesses. This multi-purpose header attachment is an invention attribute that provides significant differentiation and improvement from prior art. The TEA-UP Header delivers multiple types of products to Users that improve their beverage enjoyment experience versus prior art and/or the overall value of the product versus prior art. The TEA-UP Headers are attached at the top of the Header Shaft and are efficiently and attractively displayed on a "Personal Beverage Flag Pole" extending from packaging prior to beverage creation, from a beverage during preparation and from packaging or a beverage while being consumed.

Header types can be submitted as personalized images on-line, ordered online from licensed e-catalogs or selected from available retail outlet provided options. Following are some example header types with comments on their value;

Character Header Type

Figure 3A:
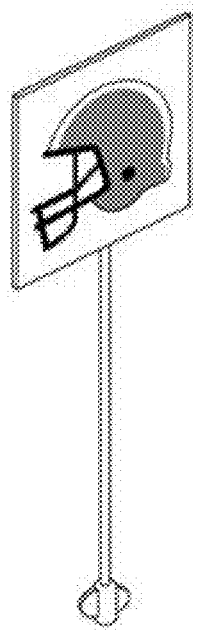
FIG. 3A—Illustrates a perspective view of a header type. Character Header with an example sports team logo.

A Character Header type with a sports team logo is illustrated in FIG. 3A. Licensing sports team logos and related images and will enable significant retail and online sales. The Manchester United Football Club has an estimate of more than 600 Million fans worldwide. The ability to "show off" your team commitment while enjoying a premium beverage is an experience enhancing result of a TEA-UP header. The ability to select Sports Team Headers and create gift packages of premium tea is an improvement over current standard tea gifts. Sports Team Headers can also be individual team member images and sports action images.

Figure 3B:
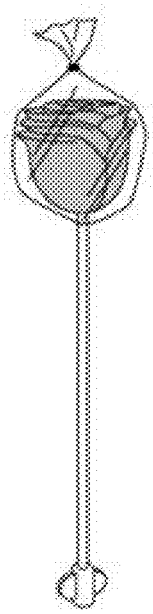
FIG. 3B—Illustrates a perspective view of a header type. Edible Header with an example chocolate flower covered by a clear wrapper.
Figure 3C:
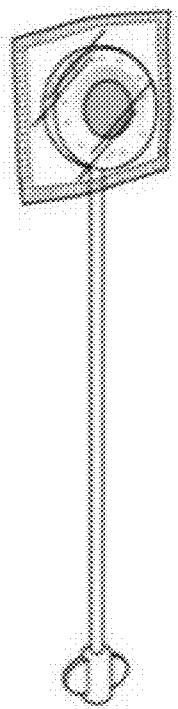
FIG. 3C—Illustrates a perspective view of a header type. Edible Header with a breath Mint covered by a clear wrapper.
Figure 3D:
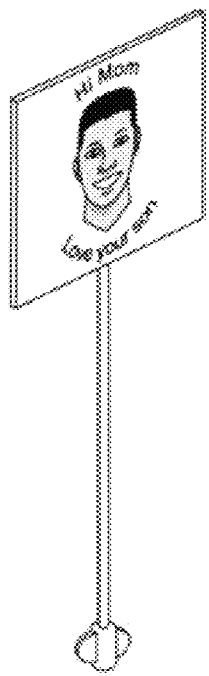
FIG. 3D—Illustrates a perspective view of a header type. Personalized Header with an example of a picture and message submitted on-line by an Invention User.
Figure 3E:
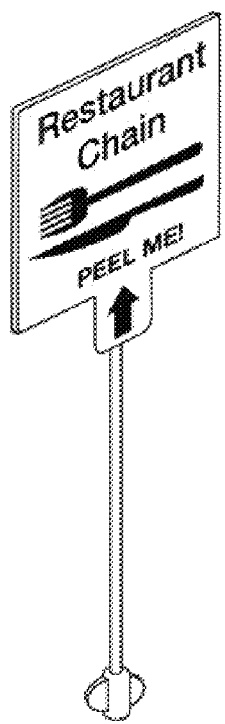
FIG. 3E—Illustrates a perspective view of a header type. Special Promotion Header example that contains information underneath a "peel-up" cover.
Figure 3F:
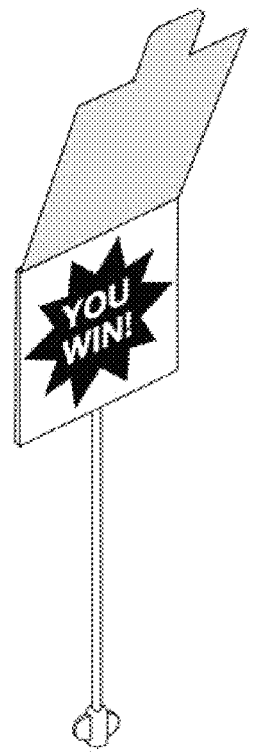
FIG. 3F—Illustrates a perspective view of a header type. Special Promotion Header that has cover face peeled up revealing information.
Figure 3G:
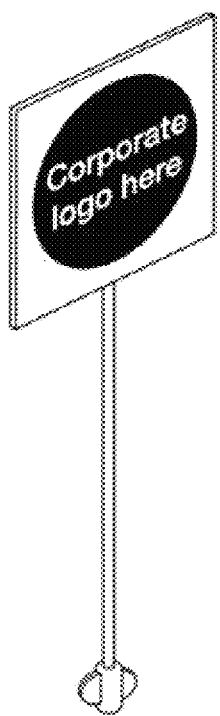
FIG. 3G—Illustrates a perspective view of a header type. Character Header type with an example company logo header.
Figure 3H:
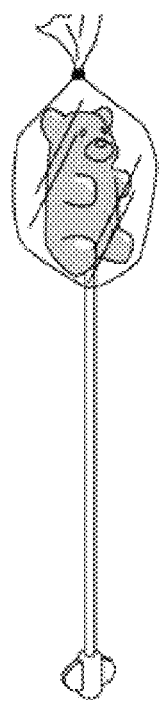
FIG. 3H—Illustrates a perspective view of a header type. Edible Header with an example probiotic infused chewy candy covered by a clear wrapper.
Figure 3I:
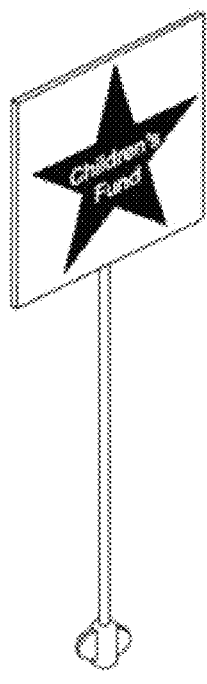
FIG. 3I—Illustrates a perspective view of a header type. Character Header with charity organization header logo.

Other Character Header types can be Charity and Fundraising Group Headers (FIG. 3I). Charities will be able to leverage fundraising programs that contribute a percent of sales from on-line TEA-UP sales from Charity Header Catalogs. They will also be able to order custom Charity Gift Packages with specialized Charity marketing elements including Charity headers on beverage infusion serving packages. These packages can be re-sold as part of fundraising programs. This value to these organizations enabled by the TEA-UP headers is an improvement over prior art.

Figure 3J:
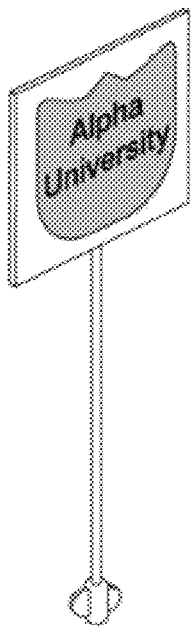
FIG. 3J—Illustrates a perspective view of a header type. Character Header with an example academic institution logo.
Figure 3K:
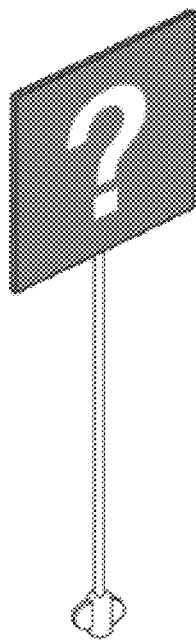
FIG. 3K—Illustrates a perspective view of a header type. Hidden Secret Header which includes a cover over a header. Header information and/or product are hidden until cover is removed.
Figure 3L:
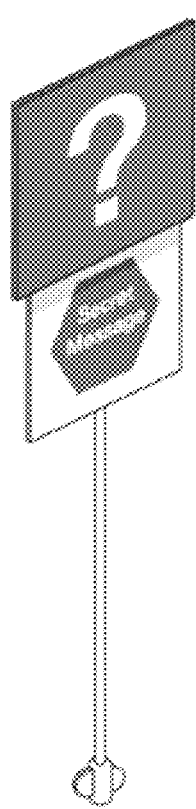
FIG. 3L—Illustrates a perspective view of a header type. Hidden Secret Header with the cover removed revealing header information and/or product contents.
Figure 3M:
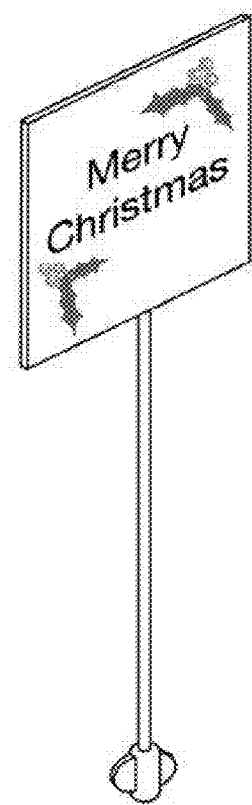
FIG. 3M—Illustrates a perspective view of a header type. Character Header example that is Christmas Holiday theme based.

Other Character Header types can be Academic Institution and Alumni Group Headers (FIG. 3J). Character Header Types will be developed for many groups and interests that Customers demand. TV shows (Star Trek), Music (Rolling Stones), Fraternities, Stars, Personal Interests (Surfing) and Holiday themed headers (FIG. 3M) are to name a few header groups that will result in a high volume of header image catalogs to be created for on-line sales options and to support retail programs.

Edible Header Types

Figure 2C:
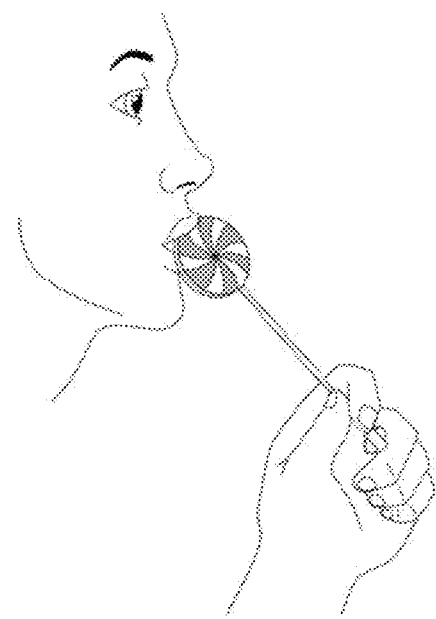
FIG. 2C—Illustrates an edible header detached from the base tea bag attachment and being consumed by a user.

A chocolate flower edible header is illustrated in FIG. 3B. Edible attachments can come in all shapes, sizes and types. These edible headers can be detached from the tea bag attachment (FIGS. 2A & FIG. 2B) and the edible attachment enjoyed in "lollipop" format (FIG. 2C). A breath mint edible header is illustrated in FIG. 3C. A probiotic infused gummy candy with edible header wrapper is illustrated in FIG. 3H. Users can enjoy character headers that are the wrapper covers for edible headers. The ability to efficiently deliver edible headers that can be enjoyed as part of a beverage break experience is an improvement over prior art.

Personalized Header Types

A personalized header with a face picture and personal message submitted by a user is illustrated in FIG. 3D. Significant and relevant gifts can be generated by adding personalized images and messages to premium infused disposable beverage packages. The ability to add personal headers to premium beverage experiences is an improvement over prior art.

For example, A Husband is going away on a business trip and his Wife can go on-line and submit 10 different pictures of her with 10 different personal messages. These can be easily uploaded and input on-line and turned into personalized headers. She can also select different tea types with 10 different premium tea flavors. The Wife can now give the husband a going away present that includes a daily life enhancing experience of having a premium tea break that includes an emotional boost of enjoying a custom picture of his wife and a custom message.

The personalized header experience can be further improved by adding a secret header cover that hides the header (FIG. 1K) until the individual beverage experience begins and the header is uncovered by the user (FIG. 1L), revealing the personal header.

Special Promotional Header Types

A special promotional header that contains information underneath a "Peel-up" cover is illustrated in FIG. 3E and FIG. 3F. The ability for businesses to deliver a premium infused beverage experience in a disposable, individual serving package and that also delivers promotional information and material using a sealed covering will enable businesses to deliver more value to Customers with this invention. This ability is an improvement over prior art.

For example, a restaurant chain provides the TEA-UP beverage as part of their menu and orders customized special promotion headers that include gift coupons as part of the headers. The Server script to a tea requesting Customer can be: "We carry the TEA-UP premium teas brand. These teas are excellent and come in this neat form that enables you to get strong flavor infusion fast. It also makes more than one cup or strong flavored tea. Here is the menu of tea types and flavor selections. The Cherry Chocolate Black Tea, excellent choice! I will be right back."

As the Server delivers the TEA-UP in the packaging to the restaurant Customer, the Server continues to market the TEA-UP value by saying, "Here is your hot water and tea, simply remove it from the packaging and give it some pumps in the water until your tea is at the required strength. Then just remove it and place it in the original packaging which has a plastic lined tea bag container. If you want more cups, just ask me for more hot water and the TEA-UP can be easily used for your next cup. Also we have a special promotional header, just peel it up and you can win some prizes! Enjoy!"

The Customer enjoys their premium beverage experience, enjoys multiple cups of desired strength tea and peels up the promotional header and wins a free desert on their next visit to any restaurant in the popular restaurant chain. The Customer detaches the shaft from the tea bag attachment and pocket the lollipop size shaft and coupon header attachment to be redeemed on their next visit to the restaurant chain.

The ability for businesses that serve infused beverages to utilize the TEA-UP to deliver promotions and other information is an improvement over prior art.

Figure 4A:
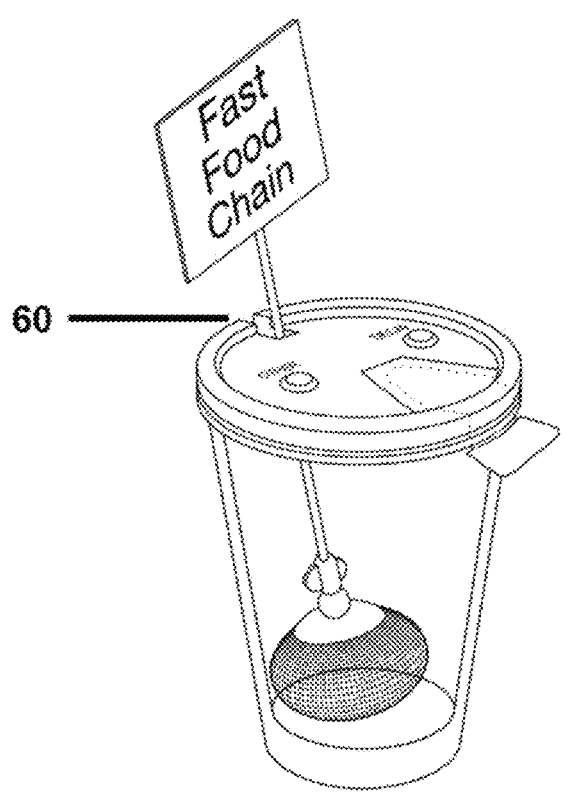
FIG. 4A—Illustrates a perspective view of the invention delivered in a portable, disposable beverage container with a modified lid that allows the invention shaft and header to extend from a covered beverage container.
Figure 4B:
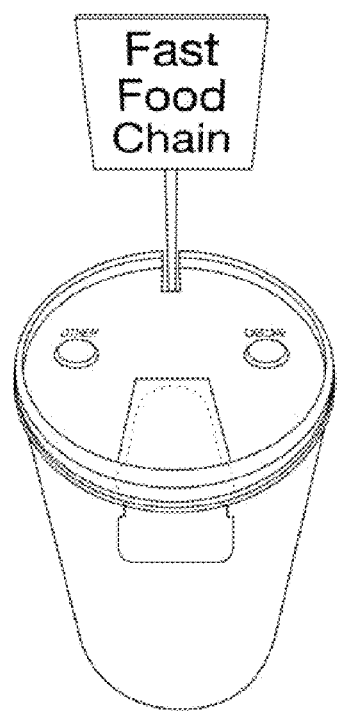
FIG. 4B—Illustrates a overhead view of the invention delivered in a portable, disposable beverage container with a modified lid that enables the invention shaft and header to extend from the covered beverage container. The lid has a modified opening that is opposite the drinking opening.

Other businesses that sell beverages will benefit from provided an attractive designed, compact, disposable beverage infusion apparatus that they can easily insert into a disposable cup of hot water and also leverage the Header Attachment to market anything they would like. FIG. 4A and FIG. 4B illustrates a TEA-UP apparatus with a fast food restaurant header served in a standard disposable cup with a modified disposable cup lid that enables a Header Shaft to efficiently extend through the lid and the lid to be easily removed and replaced.

Company Character Header Types

A Company Character Header Type is illustrated in FIG. 5G. Companies in offices provide coffee, tea and other beverages in offices throughout the world. Many companies will want to deliver premium tea of many types and flavors to their employees. They will find the cleanliness and disposability attractive and the ability for their employees to be able to regulate their own flavor and use one serving unit for more than one serving of beverage. They will also have the ability to leverage the customized header to provide company information or the base company logo. For example, New Product Launch date and Product Logo could be provided on internal company TEA-UP packages.

The header types provided with a TEA-UP are not limited to the examples provided in this section.

The invention claimed is:

1. A beverage infusion unit comprising an infusion materials container; a buoyancy attachment that is attached to the top of the infusion materials container; a shaft attachment that is attached to the top of the buoyancy attachment; a header attachment that is attached to the top of the shaft; wherein the buoyancy ability of the infusion unit in combination with the structure and orientation of the infusion materials container and the length of the shaft attachment provides increased infusion results when disposed within a fluid by increasing flow rate and force of fluid passing infusion materials when the infusion container is moved downward and upward in said fluid.

2. The infusion unit of claim 1, further comprising individual unit external packaging which converts into a waterproof holding container that is used to hold the infusion unit in an upright position for display and after using the beverage infusion unit can be re-used for disposal of the used beverage infusion unit after immersion in the fluid.

3. The infusion unit of claim 1, wherein said header attachment further include indicia or ornamental design attached thereto.

\* \* \* \* \*